UNITED STATES PATENT OFFICE

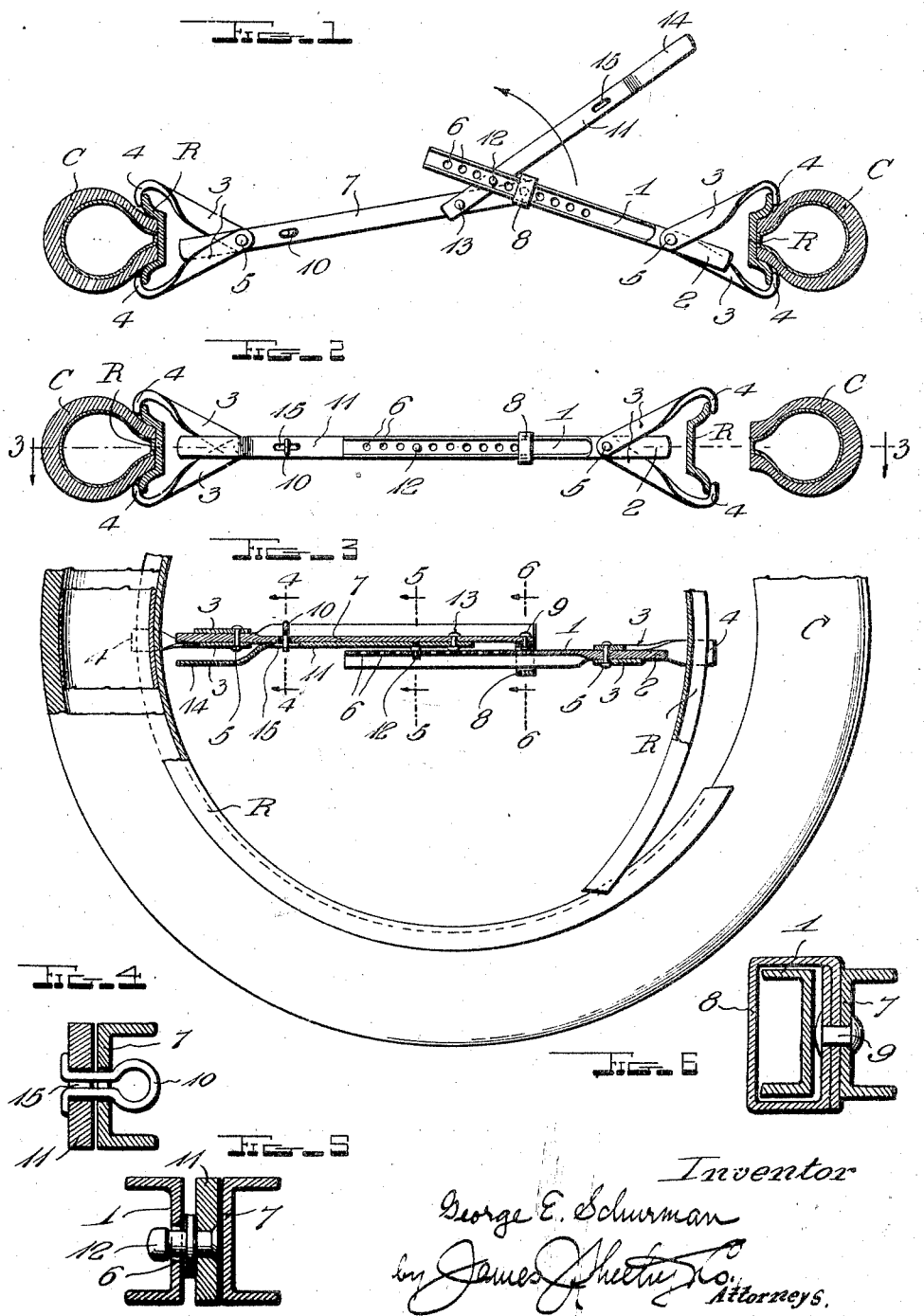

GEORGE E. SCHURMAN, OF PITTSBURGH, PENNSYLVANIA.

TIRE-REMOVER.

1,319,624.    Specification of Letters Patent.    Patented Oct. 21, 1919.

Application filed May 6, 1919. Serial No. 295,179.

*To all whom it may concern:*

Be it known that I, GEORGE E. SCHURMAN, a citizen of the United States, residing at Pittsburgh, in the county of Allegheny and State of Pennsylvania, have invented new and useful Improvements in Tire-Removers, of which the following is a specification.

My present invention pertains to automobile tire rim removers and it contemplates the provision in a device of the character set forth of means whereby a rim may be easily and quickly removed from one side of the tire casing and safely retained in said position while the inner tube is being removed from said casing.

Another feature of the invention is the novel arrangement of elements whereby the rim may be forced back against the casing after the inner tube has been properly adjusted therein.

Other objects and characteristics of the invention are the compactness of the device when not in use and also its ability to be adjusted to various sizes of rims.

With the foregoing in mind, the invention will be fully understood from the following description and claims when the same are read in connection with the drawings accompanying and forming part of this specification, in which:—

Figure 1, is a transverse section, showing the application of my device prior to contracting the rim.

Fig. 2, is a similar view, with the rim contracted to permit the removal of the inner tube.

Fig. 3, is a horizontal section, taken in the line 3—3 of Fig. 2.

Figs. 4, 5 and 6 are transverse vertical sections on an enlarged scale, taken on the lines 4—4, 5—5 and 6—6, of Fig. 3.

Similar numerals of reference designate corresponding parts in all of the views of the drawings.

I would have it distinctly understood that my novel device is formed of a material that will not break should it fall, upon a hard surface and contains no parts such as bearings that are likely to get out of order after a short period of use, and it comprises an arm 1, of channel form in cross section, and at its outer end 2, said channel is constructed so as to form a solid piece for an important purpose hereinafter set forth.

The arm 1, is provided slightly below the starting point of the head 2, with arm 3, having hooks 4 and said hooks or tongs are secured to the arm 1, by a through and through bolt 5. In its inner end the arm 1, is provided with a series of openings 6. The arm 7, is constructed similar to arm 1, with the exception that it is slightly longer and is void of openings 6. It has like arm 7 the head 2, arms 3 and through and through bolt 5. The said arm 7 has a strap 8 secured by a bolt 9 to its inner end and at 10 the arm is provided with a keeper.

At a point opposite the channel of arm 7, I fulcrum a lever 11 having a knob or projection 12, said lever being secured to the arm 7 by a double-headed bolt 13. At its upper end the lever 11 is bent upwardly as indicated by 14 and below said upwardly extending bend, I provide a slot 15 as clearly shown in Figs. 1, 2 and 3.

It will be appreciated by reference to the drawings, that when it is desired to adjust the arms 1 and 7 for use, it is simply necessary to pass the inner end of arm 1, through the strap 8. The hooks 4 of one arm are then placed on either side of a rim, about twelve inches from the split thereof and the hooks of the opposing arm are then placed directly opposite the first set of hooks and in the same manner on the rim. The lever 11, is then extended to its full length and the knob or pin 12, is forced into the nearest opening 6, of arm 1. It is then simply necessary to break the joint and force the lever 11, downwardly as indicated by arrows in Fig. 1, until it rests parallel with knob 7. The keeper 10 is then adjusted so as to rest in slot 15, and when this has been accomplished the rim will be forced inwardly from the tire shoe or casing (see Fig. 3) and held in a safe and secure postion. When the inner tube has been placed in the casing and the same has been replaced on the rim, the pin is forced into the next opening of arm 1, and by reversing the movement of the lever the rim will expand until it rests in its normal position.

It will be appreciated from the foregoing that because of the fact that the arms 3 are mounted slightly above the head 2 on members 1 and 7, the said head will rest against the rim and when the lever is forced upwardly the ends of the heads will assist in forcing the rim against the casing.

Because of the channel form of construction of members 1 and 7 it will be appreciated that said members are more able to stand pressure than were they constructed of a solid piece of iron.

Having described my invention, what I claim and desire to secure by Letters Patent is:—

In a tire rim remover, the combination of an arm, hooks secured to one end thereof, openings in the opposite end thereof, a second arm, hooks secured to one end thereof, a strap in which the first-named arm may slide secured at the end opposite to that in which the hooks are secured in the second-named arm, a lever secured by its lower end to the second-named arm at a point slightly in rear of the strap, and an integral stud formed on the lever and adapted to enter an opening of the first-named arm whereby movement of the lever in one direction will cause the hooks of each arm to travel toward each other and movement of the lever in the opposite direction will cause said hooks to travel away from each other.

In testimony whereof I have hereunto set my hand in presence of two subscribing witnesses.

GEORGE E. SCHURMAN

Witnesses:
HENRY EICHERESCKS,
WM. E. POTTMEYER.